(12) United States Patent
Patangia (10) Patent No.: US 11,973,849 B1
(45) Date of Patent: Apr. 30, 2024

(54) SYSTEM AND METHOD FOR AUTOMATED DATA SORTING IN AN ELECTRONIC NETWORK

(71) Applicant: BANK OF AMERICA CORPORATION, Charlotte, NC (US)

(72) Inventor: Vishal Patangia, West Hills, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/212,931

(22) Filed: Jun. 22, 2023

(51) Int. Cl.
*H04L 67/63* (2022.01)

(52) U.S. Cl.
CPC .................................. *H04L 67/63* (2022.05)

(58) Field of Classification Search
None
See application file for complete search history.

(56) References Cited

U.S. PATENT DOCUMENTS

| | | | | |
|---|---|---|---|---|
| 2023/0058383 A1* | 2/2023 | Mueck | ................... | H04L 41/069 |
| 2023/0079209 A1* | 3/2023 | Nallamothu | .......... | H04L 45/745 709/238 |
| 2023/0087454 A1* | 3/2023 | Cheng | ..................... | H04L 69/22 709/224 |
| 2023/0097734 A1* | 3/2023 | Parla | ................... | H04L 63/0236 713/151 |
| 2023/0344758 A1* | 10/2023 | Hart | ........................ | H04L 65/65 |

* cited by examiner

*Primary Examiner* — Jeffrey R Swearingen
(74) *Attorney, Agent, or Firm* — Moore & Van Allen PLLC; Nicholas C. Russell (57) ABSTRACT

Systems, computer program products, and methods are described herein for automated data sorting in an electronic network. The method includes receiving a primary tag designation corresponding to a recipient of a data transfer from an end-point device associated with a sending user. The method also includes providing the end-point device with sub-tag(s) associated with the primary tag designation. Each of the sub-tag(s) correspond to an individual category of the data transfer. The method further includes receiving the transfer data packet that includes the primary tag designation and at least one of the sub-tag(s). The transfer data packet indicates data to be transmitted to the recipient in the data transfer. The method also includes causing the data transfer to be executed. The data transfer includes the primary tag designation and the at least one of the one or more sub-tags included in the transfer data packet.

20 Claims, 5 Drawing Sheets

SYSTEM AND METHOD FOR AUTOMATED DATA SORTING IN AN ELECTRONIC NETWORK

TECHNOLOGICAL FIELD

Example embodiments of the present disclosure relate generally to data routing and, more particularly, to automated data sorting in an electronic network.

BACKGROUND

Large scale data transfers can be difficult to track and categorize in a meaningful way. As a result, there are difficulties determining the purpose of data transfers across a network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for automated data sorting in an electronic network is provided. The system includes at least one non-transitory storage device containing instructions and at least one processing device coupled to the at least one non-transitory storage device. The at least one processing device, upon execution of the instructions, is configured to receive a primary tag designation for a transfer data packet from an end-point device associated with a sending user. The primary tag designation corresponds to a recipient of a data transfer. The at least one processing device, upon execution of the instructions, is also configured to provide the end-point device associated with the sending user with one or more sub-tags associated with the primary tag designation. Each of the one or more sub-tags correspond to an individual category of the data transfer. The at least one processing device, upon execution of the instructions, is further configured to receive the transfer data packet from the end-point device associated with the sending user. The transfer data packet includes the primary tag designation and at least one of the one or more sub-tags and the transfer data packet indicates data to be transmitted to the recipient in the data transfer. The at least one processing device, upon execution of the instructions, is still further configured to cause the data transfer to be executed. The data transfer is from an account associated with the sending user to an account associated with the recipient. The data transfer includes the primary tag designation and the at least one of the one or more sub-tags included in the transfer data packet.

In various embodiments, the at least one processing device, upon execution of the instructions, is configured to receive information relating to a plurality of data transfers with each of the plurality of data transfers being associated with the primary tag designation and include at least one of the one or more sub-tags.

In various embodiments, the at least one processing device, upon execution of the instructions, is configured to determine one or more of the plurality of data transfers that correspond to a first sub-tag of the one or more sub-tags. In various embodiments, the at least one processing device, upon execution of the instructions, is configured to cause a transmission of sub-tag information with the sub-tag information being based on each of the data transfers that include the first sub-tag.

In various embodiments, the at least one processing device, upon execution of the instructions, is configured to determine one or more of the plurality of data transfers that correspond to a second sub-tag of the one or more sub-tags.

In various embodiments, the at least one processing device, upon execution of the instructions, is configured to cause a transmission of sub-tag information with the sub-tag information being based on each the data transfers that include the first sub-tag and each of the data transfers that include the second sub-tag.

In various embodiments, the at least one processing device, upon execution of the instructions, is configured to receive at least one of the one or more sub-tags from the recipient with the recipient indicating each of the one or more sub-tags that may be used with the primary tag designation.

In another example embodiment, a computer program product for automated data sorting in an electronic network is provided. The computer program product includes at least one non-transitory computer-readable medium having computer-readable program code portions embodied therein. The computer-readable program code portions include one or more executable portions configured to receive a primary tag designation for a transfer data packet from an end-point device associated with a sending user. The primary tag designation corresponds to a recipient of a data transfer. The computer-readable program code portions include one or more executable portions configured to provide the end-point device associated with the sending user with one or more sub-tags associated with the primary tag designation. Each of the one or more sub-tags correspond to an individual category of the data transfer. The computer-readable program code portions include one or more executable portions also configured to receive the transfer data packet from the end-point device associated with the sending user. The transfer data packet includes the primary tag designation and at least one of the one or more sub-tags. The transfer data packet indicates data to be transmitted to the recipient in the data transfer. The computer-readable program code portions include one or more executable portions further configured to cause the data transfer to be executed. The data transfer is from an account associated with the sending user to an account associated with the recipient. The data transfer includes the primary tag designation and the at least one of the one or more sub-tags included in the transfer data packet.

In various embodiments, the computer-readable program code portions include one or more executable portions are also configured to receive information relating to a plurality of data transfers with each of the plurality of data transfers being associated with the primary tag designation and include at least one of the one or more sub-tags.

In various embodiments, the computer-readable program code portions include one or more executable portions are also configured to determine one or more of the plurality of data transfers that correspond to a first sub-tag of the one or more sub-tags. In various embodiments, the computer-readable program code portions include one or more executable portions are also configured to cause a transmission of sub-tag information with the sub-tag information being based on each of the data transfers that include the first sub-tag.

In various embodiments, the computer-readable program code portions include one or more executable portions are also configured to determine one or more of the plurality of data transfers that correspond to a second sub-tag of the one or more sub-tags.

In various embodiments, the computer-readable program code portions include one or more executable portions are also configured to cause a transmission of sub-tag information with the sub-tag information being based on each the data transfers that include the first sub-tag and each of the data transfers that include the second sub-tag.

In various embodiments, the computer-readable program code portions include one or more executable portions are also configured to receive at least one of the one or more sub-tags from the recipient with the recipient indicating each of the one or more sub-tags that may be used with the primary tag designation.

In still another example embodiment, a method for automated data sorting in an electronic network is provided. The method includes receiving a primary tag designation for a transfer data packet from an end-point device associated with a sending user. The primary tag designation corresponds to a recipient of a data transfer. The method also includes providing the end-point device associated with the sending user with one or more sub-tags associated with the primary tag designation. Each of the one or more sub-tags correspond to an individual category of the data transfer. The method further includes receiving the transfer data packet from the end-point device associated with the sending user. The transfer data packet includes the primary tag designation and at least one of the one or more sub-tags. The transfer data packet indicates data to be transmitted to the recipient in the data transfer. The method still further includes causing the data transfer to be executed. The data transfer is from an account associated with the sending user to an account associated with the recipient. The data transfer includes the primary tag designation and the at least one of the one or more sub-tags included in the transfer data packet.

In various embodiments, the method also includes receiving information relating to a plurality of data transfers with each of the plurality of data transfers being associated with the primary tag designation and include at least one of the one or more sub-tags. In various embodiments, the method also includes determining one or more of the plurality of data transfers that correspond to a first sub-tag of the one or more sub-tags or a second sub-tag of the one or more sub-tags.

In various embodiments, the method also includes causing a transmission of sub-tag information, wherein the sub-tag information is based on each of the data transfers that include the first sub-tag. In various embodiments, the method also includes causing a transmission of sub-tag information with the sub-tag information being based on each the data transfers that include the first sub-tag and each of the data transfers that include the second sub-tag.

In various embodiments, the method also includes receiving at least one of the one or more sub-tags from the recipient with the recipient indicating each of the one or more sub-tags that may be used with the primary tag designation.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships, or potential future relationships with an entity (e.g., such as a customer or user of a network). In some embodiments, the user may be an employee (e.g., an associate, a project manager, an IT specialist, a manager, an administrator, an internal operations analyst, or the like) of the entity or enterprises affiliated with the entity. Additionally, in some instances, a "user" may be an entity itself (e.g., a company that has an account on the network).

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Data transfers across a network can be difficult to track. Transfers made to specific users or entities may be used or intended for different uses. As such, managers of an electronic network and/or users of the electronic network (e.g., peer-to-peer resource sharing electronic networks) may wish to accurately track and tag each data transfer (e.g., resource transfer) as the data transfers are received in order to accurately record, use, and/or sort the resources as the resources are received. However, there is little way to track the categories for individual transfers and as the scale of transfers increase, it becomes untenable to accurately subdivide transfers. For example, a large charity may receive donations for many different purposes and may need to sub-divide all of the donations based on the purpose. However, current network limitations on data transfers make it difficult for a user or entity to sub-divide transfers within an individual account.

Various embodiments of the present disclosure provide a system for automated data sorting in an electronic network. To do this, users or entities on a network have a primary tag identifier (e.g., a wallet identifier or other identification value), as well as one or more potential sub-tags. The sub-tags can be automated or designated by the user of the network. As such, a user attempting to execute a data transfer (e.g., sending a resource to a recipient on a peer-to-peer resource sharing network) may designate the data transfer with a primary tag designation that indicates the recipient and one or more sub-tags that indicate the individual category in which the data transfer is intended (e.g., the purpose of the resource transfer). The sub-tags can be used to group data transfers with the same sub-tag. The groupings of data transfers with like sub-tags may be used to provide information relating to the data transfers. For example, a charity may be able to gather information relating to donations for specific sub-tags (e.g., the total amount of donations to a specific cause).

Figure 1A:
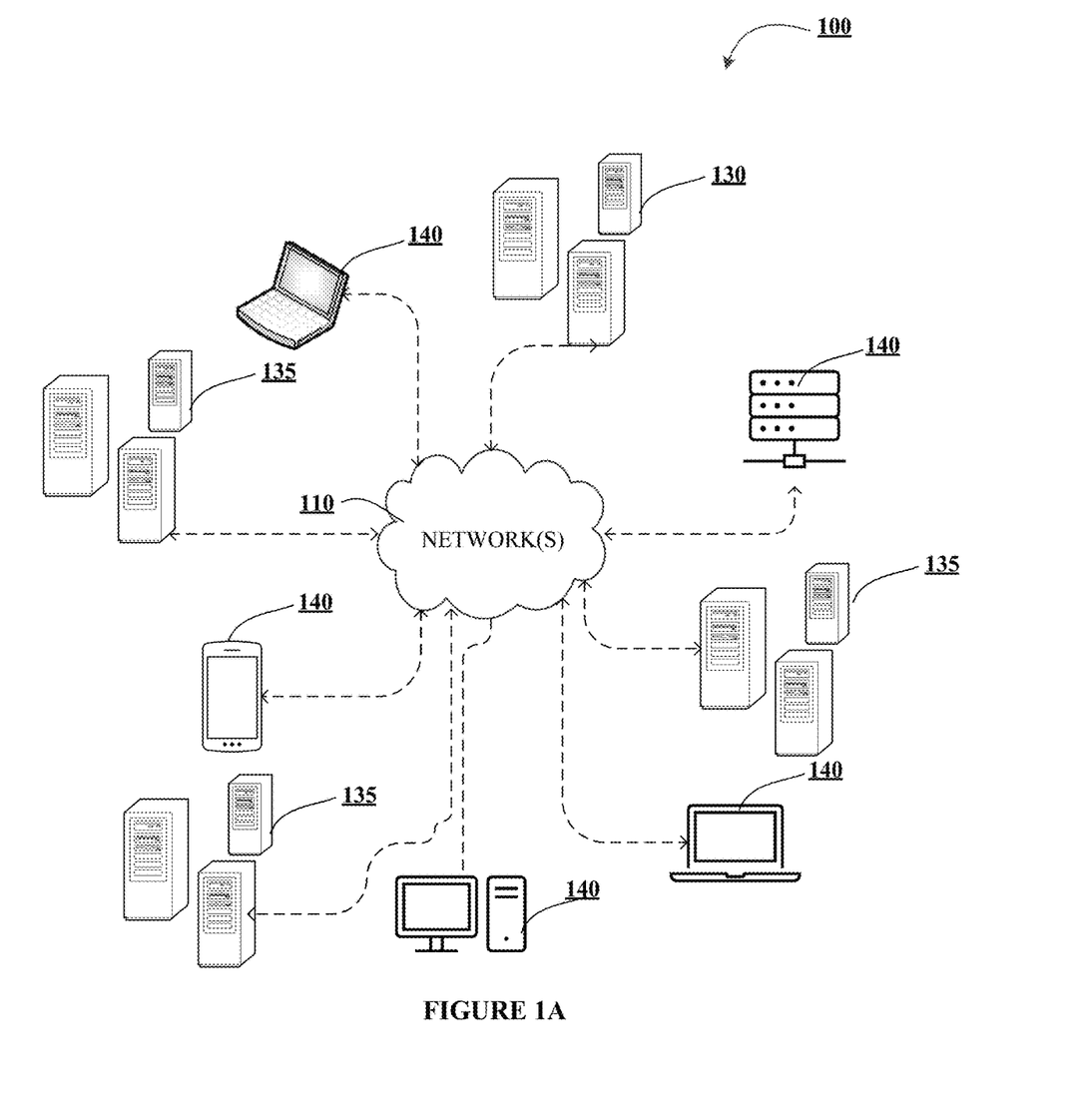
FIGS. 1A-1C illustrates technical components of an example distributed computing environment for automated data sorting in an electronic network, in accordance with various embodiments of the present disclosure.
Figure 1B:
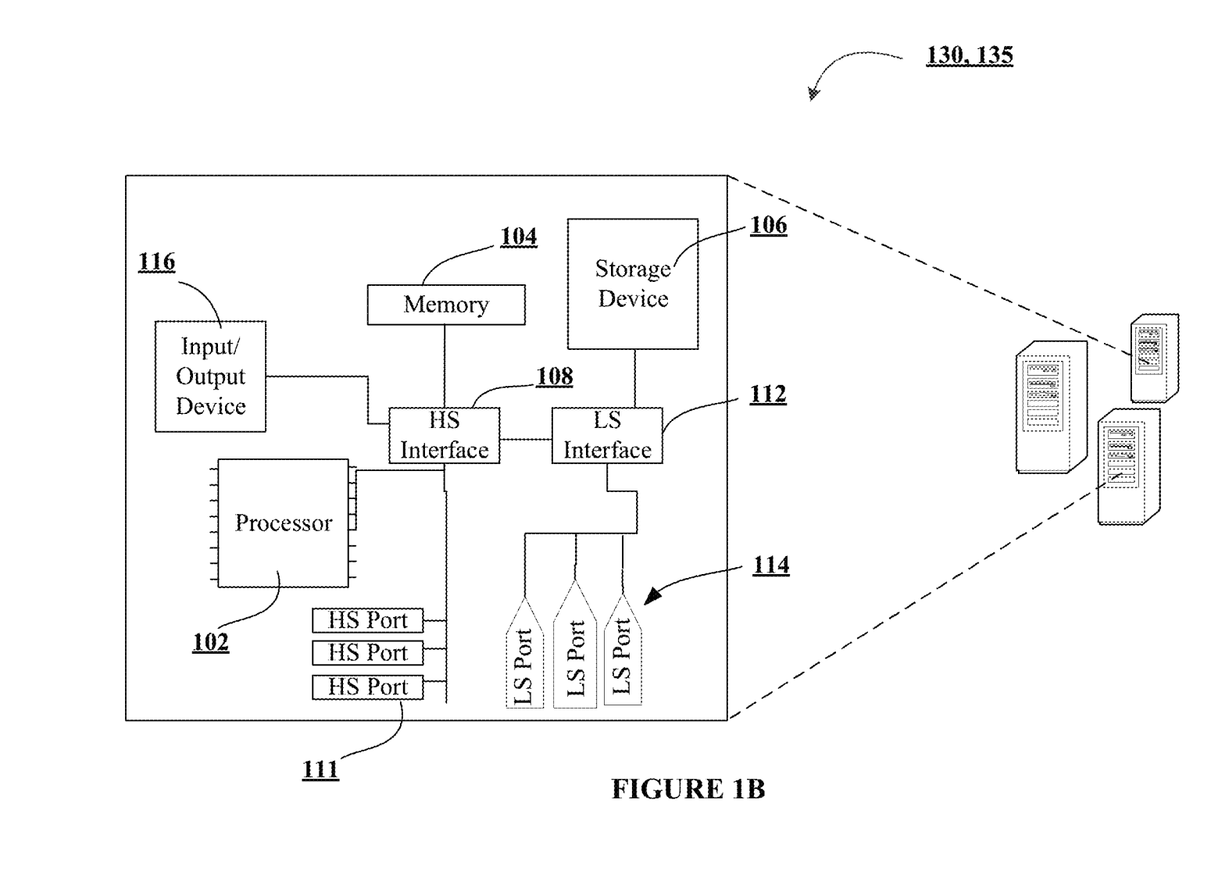
Figure 1C:
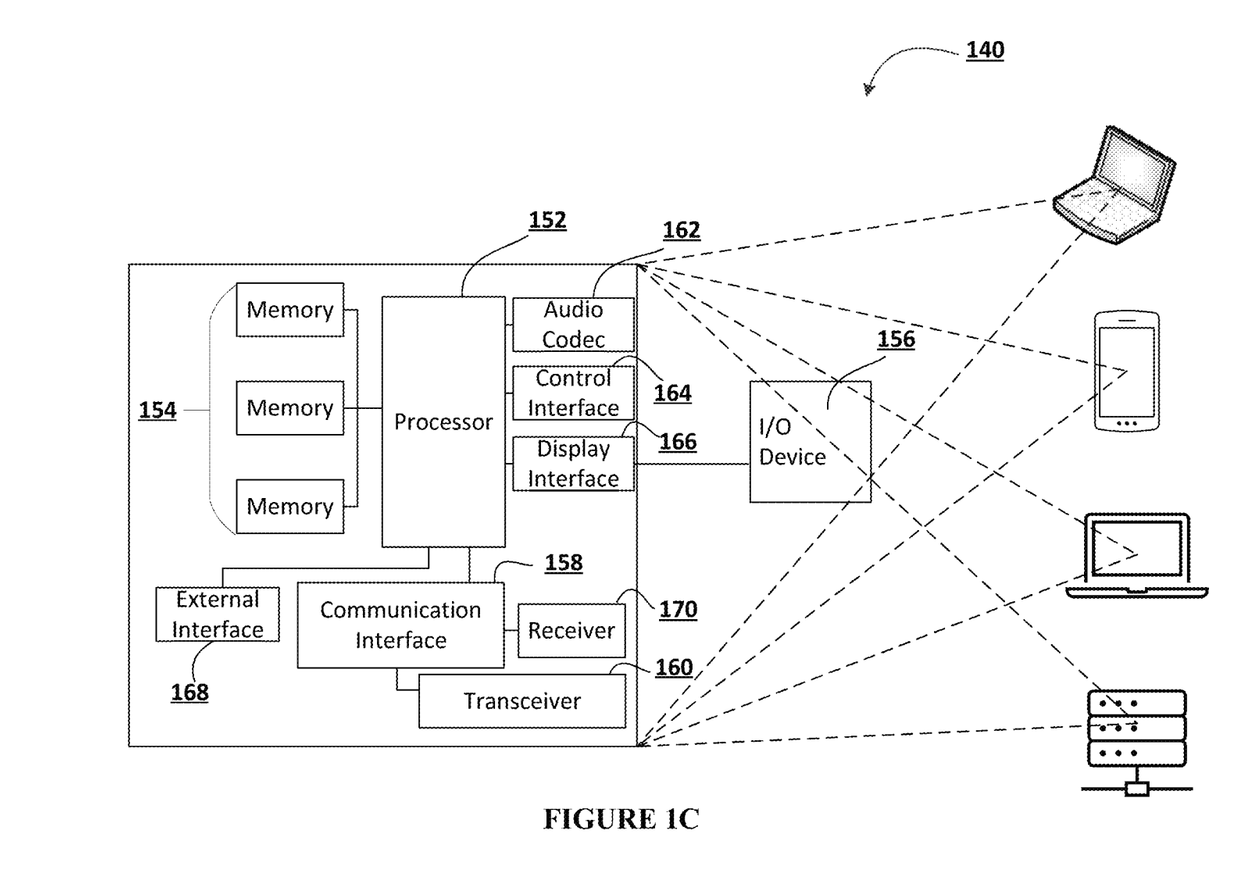

FIGS. 1A-1C illustrate technical components of an exemplary distributed computing environment for automated data sorting in an electronic network, in accordance with various embodiments of the present disclosure, in accordance with an embodiment of the disclosure. As shown in FIG. 1A, the distributed computing environment 100 contemplated herein may include a system 130 (e.g., a data routing system), one or more data centers 135, an end-point device(s) 140, and one or more network(s) 110 over which the system 130, data centers 135, and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, data center, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The data center(s) 135 (or "datacenter") may be part of, or in communication with, the system 130. The data centers 135 may be configured to transmit, process, and/or store data across the network(s) 110. A data center 135 may include one or more servers, just as the system 130. In some embodiments, one or more data centers 135 may share component(s) with the system 130 (e.g., the system 130 may share a processor with one or more data centers). Additionally or alternatively, the data center(s) 135 may be distinct from, but in communication with, the system 130 via the network(s) 110. The data center(s) 135 may be stored in different locations (e.g., a data center in a given location may have one or more servers discussed herein). Additionally, the data center(s) 135 may be individual servers of a singular data center (e.g., one or more racks of a data center may be an individual data center). Alternatively, the data center(s) 135 may have distinct physical locations from one another. The location of the data center(s) 135 discussed herein may refer to either the physical location of the data centers and/or the network location of the data center (e.g., based on the order of transmission between parts of the environment 100).

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of an example system 130 and/or an example data center 135, in accordance with an embodiment of the disclosure. While discussed herein as components of the system 130, various data centers 135 may include the components discussed herein. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130 or data center(s) 135. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other. Additionally, one or more components of the system 130 and the one or more data centers 135 may also be combined to achieve the processes discussed herein.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, one or more communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through one or more communication interfaces 158, which may include digital signal processing circuitry where necessary. Communication interface(s) 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface(s) 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130, data center(s) 135, and end-point device(s) 140, and techniques described here can be realized in digital electronic circuitry, integrated circuitry, specially designed ASICs (application specific integrated circuits), computer hardware, firmware, software, and/or combinations thereof.

Figure 2:
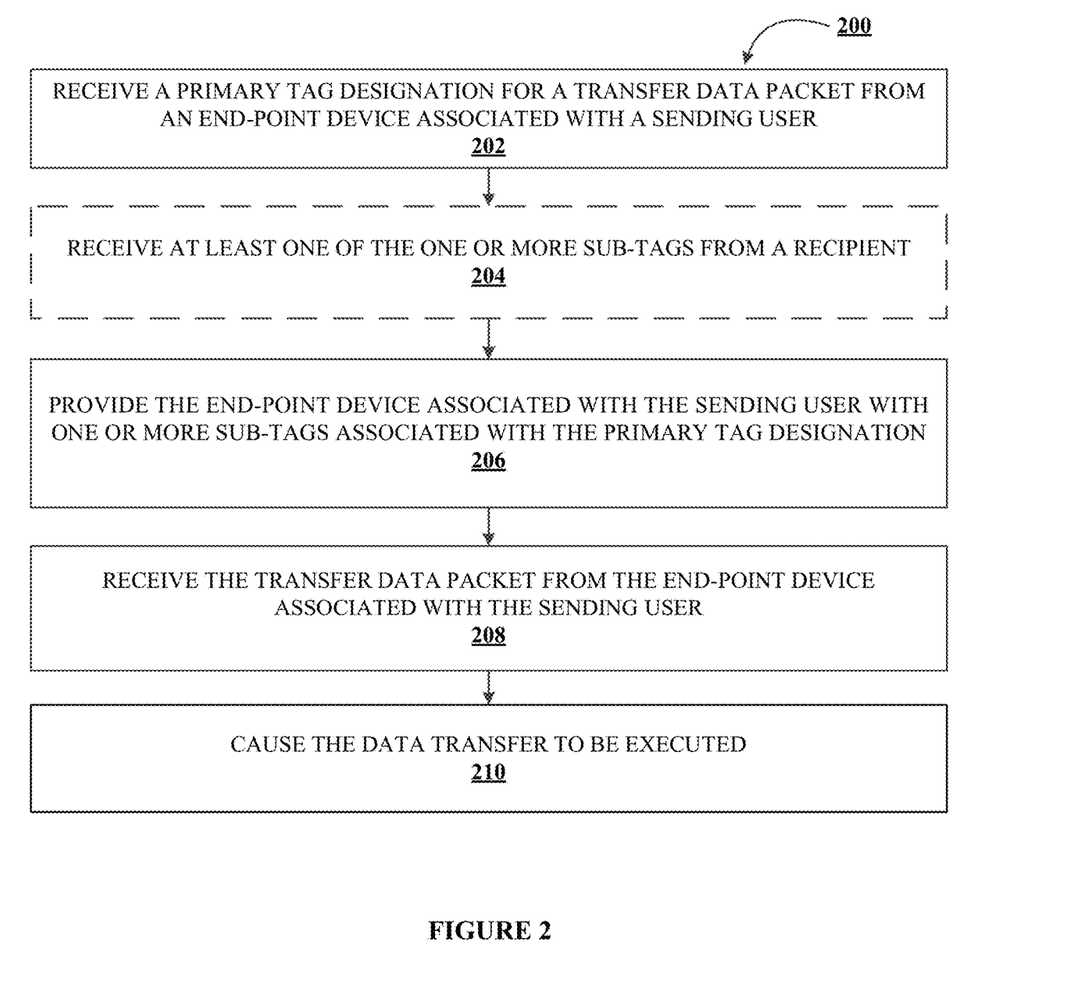
FIG. 2 illustrates a process flow for providing sub-tags to allow for automated data sorting in an electronic network, in accordance with various embodiments of the present disclosure.

FIG. 2 is a flow chart 200 that illustrates an example method of providing sub-tags to allow for automated data sorting in an electronic network, in accordance with various embodiments of the present disclosure. The method may be carried out by various components of the distributed computing environment 100 discussed herein (e.g., the system 130, the one or more data centers 135, one or more end-point devices 140, etc.). An example system may include at least one non-transitory storage device and at least one processing device coupled to the at least one non-transitory storage device. In such an embodiment, the at least one processing device is configured to carry out the method discussed herein. The operations of flow chart 200 may be completed independently or in combination (e.g., by the same system) as the operations of flow chart 300 discussed in reference to FIG. 3 below.

Figure 3:
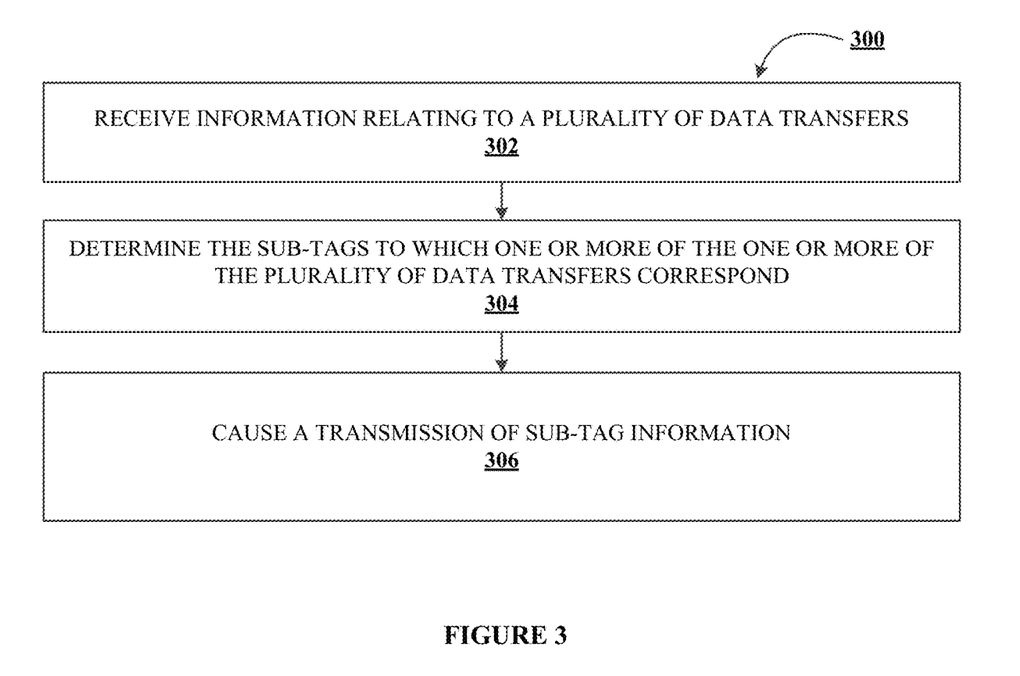
FIG. 3 illustrates a process flow for automated data sorting in an electronic network using sub-tags, in accordance with various embodiments of the present disclosure.

The operations discussed in FIG. 2 and FIG. 3 may be used with a peer-to-peer resource sharing network. For example, the peer-to-peer resource sharing network may be used to transfer resources from one account associated with a user to an account associated with another user. Each user may have one or more accounts on a network. In various embodiments, the description refers to users, users may include an individual, multiple individuals (e.g., a joint account), an entity (e.g., a corporate entity), and/or the like.

Referring now to Block 202 of FIG. 2, the method includes receiving a primary tag designation for a transfer data packet from an end-point device associated with a sending user. The primary tag designation corresponds to a recipient of a data transfer. A recipient may be any user in the network that is capable of receiving a data transfer (e.g., a recipient may be a user with a primary tag identifier). For example, in a peer-to-peer resource sharing network, each user that can receive a resource transfer may be a recipient. In various embodiments, the sending user may indicate the recipient using the primary tag identifier as discussed herein.

In various embodiments, the primary tag may include a primary tag identifier, which is a unique identifier that corresponds to a user associated with the network. As such, one or more users associated with the network that are able to receive data transfers may have a unique primary tag identifier. The primary tag identifier may be used to identify an intended recipient for a data transfer. The primary tag identifier is a unique identification value including one or more characters. Each user of the network may have a unique primary tag identifier, such that data transfers can be carried out. For example, a sending user may provide a primary tag identifier that corresponds to the intended recipient and In various embodiments, the user may be assigned a primary tag identifier during an onboarding process (e.g., for a peer-to-peer resource sharing network, the primary tag identifier may be generated in an instance in which a user creates an account on the network). In some embodiments, a user may have multiple primary tag identifier for multiple accounts (e.g., each account may have a different primary tag identifier). In such an embodiment, at least a portion of the primary tag identifier may be the same across the user identifiers for the same user (e.g., characters corresponding to the user may be the same, while characters corresponding to the account may be different). In alternative embodiments, the primary tag identifier may not share any relationship in an instance in which a user has two primary tag identifiers (e.g., for multiple accounts).

The primary tag identifier may include one or more characters that indicate information relating to the user, the user account(s), and/or transmission. For example, the primary tag identifier may indicate a user (e.g., a user number or other identifier), one or more accounts of the user, and/or the like. In an example embodiment, the primary tag identifier may be one or more alphanumerical characters (e.g., a string of hexadecimal characters).

The primary tag identifier may also be encrypted and/or otherwise secured to prevent tampering and/or malfeasance. For example, the primary tag identifier may be encrypted (e.g., using a hash function) and the decrypted value indicates the user associated with the primary tag identifier. In such an instance, one or more entities in the network may be capable of decrypting the primary tag identifier. In such an instance, the primary tag identifier can securely be transmitted across the network(s) 110.

In various embodiments, the primary tag identifier may be available to one or more users in the network (e.g., a database may include primary tag identifiers for one or more users). Additionally or alternatively, primary tag identifiers may be private (e.g., a recipient may provide the primary tag identifier to any potential sending users). The primary tag identifier may also be in the form of a QR code, and/or the primary tag identifier may be obtained via scanning a QR code (e.g., a sending user may scan a QR code for the recipient, which provides the primary tag identifier to the sending user or end-point device associated with the user).

In an example embodiment in which the network is a peer-to-peer resource sharing network, the primary tag identifier may be used to identify recipient of resource transfers. As such, a data transfer (or data packet associated with the data transfer) may include the primary tag identifier of the recipient (e.g., as the primary tag designation discussed above).

Referring now to optional Block 204 of FIG. 2, the method includes receiving at least one of the one or more sub-tags from a recipient. In various embodiments, the one or more sub-tags may correspond to correspond to an individual category of the data transfer. For example, the individual category may include a purpose for the data transfer (e.g., reason for sending resources via a peer-to-peer resource sharing network). For example, a user may intend for a resource transfer to be used for a specific purpose, such as within a dedicated fund. In another example, the individual category may be for a payment of a bill. Various individual categories may be used.

In various embodiments, the recipient may provide one or more individual categories for which a sending user to select. For example, a charity may have different types of donation funds and, as such, the charity may indicate that a sub-tag be created and/or used for one or more individual fund. In various embodiments, the recipient may select from pre-generated sub-tags (e.g., payments, reimbursement, charity fund, etc.). Additionally or alternatively, the recipient may provide customized sub-tags (e.g., a recipient may identify unique individual categories unique to the recipient). In various embodiments, the sub-tags may be a combination of pre-generated sub-tags and customized sub-tags.

In various embodiments, the sub-tags may be autogenerated. In such an instance, the autogenerated sub-tags may be used without any recipient approval or review. Alternatively, the recipient may review the autogenerated sub-tags and approve, edit, and/or reject the autogenerated sub-tags. For example, the system may cause a transmission of the one or more autogenerated sub-tags to end-point device associated with the user (or representative of the user), the one or more autogenerated sub-tags may be rendered to the user interface of the end-point device, and the system may receive an input from the end-point device (e.g., an approval, a modification, or a rejection of the autogenerated sub-tag(s)). In various embodiments, the system may provide the autogenerated sub-tags to the end-point device associated with the user (or representative of the user) as an initial sub-tag set and the user may provide one or more changes to the autogenerated sub-tags (e.g., providing new sub-tags (customized or pre-generated), removing one or more autogenerated sub-tags, modifying one or more autogenerated sub-tags, etc.).

Selection and/or generation of the sub-tag(s) associated with a user may be at time of registering for primary tag or at a later time. For example, individual categories may be changed and/or adjusted over time (e.g., a campaign may end that had a sub-tag and therefore the sub-tag is no longer relevant). As such, sub-tags associated with a primary tag identifier may change over time (e.g., sub-tags may be changed, removed, added, etc.). Changes to the sub-tags may be completed in the same way that the sub-tags are generated discussed above (e.g., either autogenerated or provided by the given recipient).

The sub-tags corresponding to the user may also be associated with the primary tag identifier for the user. As such, the primary tag identifier may be associated with the one or more sub-tags associated with the user. As such, a given sub-tag may only be successfully used in an instance in which the primary tag designation of the resource data packet includes the primary tag identifier associated with the given sub-tag.

Referring now to Block 206 of FIG. 2, the method includes providing the end-point device associated with the sending user with one or more sub-tags associated with the primary tag designation. As discussed above, each of the sub-tags may correspond to an individual category of the data transfer.

In various embodiments, the one or more sub-tags may be provided to the end-point device associated with the sending user via visual or audible presentation (e.g., one or more sub-tags may be provided to a user interface of the end-point device associated with the sending user). In various embodiments, the system may provide the end-point device associated with the sending user with all of the sub-tags associated with the given primary tag identifier (e.g., the sending user may select the sub-tag from a list of sub-tag choices). Alternatively, the system may only provide a subset of the sub-tag(s) associated with the primary tag identifier to the end-point device associated with the sending user. For example, the system may provide recommended sub-tag(s), such as most popular sub-tags, recently used sub-tags, sub-tags based on the data transfer (e.g., a large resource transfer may be more likely to be associated with certain sub-tags), and/or the like. In such an example, the sending user may select from the recommended sub-tag(s) and/or request additional sub-tag options. In an instance in which additional sub-tag options are requested, more recommended sub-tags may be provided and/or all of the sub-tags may be provided.

In various embodiments, the one or more sub-tags may be provided to the end-point device associated with the sending user by confirming an entry by the sending user. For example, a sending user may provide a sub-tag for a data transfer and the system may confirm that the sub-tag is accepted (e.g., that the sending user provided sub-tag is one of the sub-tag(s) associated with the primary tag identifier).

Referring now to Block 208 of FIG. 2, the method includes receiving the transfer data packet from the end-point device associated with the sending user. The transfer data packet includes the primary tag designation (e.g., the primary tag identifier of the recipient) and at least one of the one or more sub-tags. The transfer data packet also includes information relating to the data transfer. For example, the transfer data packet may include the recipient, the data type to be transferred, the time for the data transfer to be executed, the account from which a resource is to be transferred, and/or the like.

In an example embodiment in which the network is a peer-to-peer resource sharing network, the transfer data packet may include a resource transfer request from an account associated with the sending user to an account associated with the recipient. In various embodiments, any transfer data packets transmitted across the network may require a primary tag identifier to be process. The primary tag identifier may be included in the transfer data packet in various forms, such as metadata, inclusion in file name or heading, and/or the like. In various embodiments, one or more sub-tag(s) may be included in the transfer data packet in the same or similar form as the sub-tag.

In various embodiments, the transfer data packet may include data to be transmitted and/or information relating to the data to be transmitted across network(s) 110. For example, the transfer data packet may include routing information, account details, transmission history, account and/or user credentials, account limits, and/or the like associated with data to be transmitted across the network(s) 110. In some instances, the transfer data packet may include at least a portion of the associated data to be transmitted. Additionally or alternatively, the transfer data packet may include information to locate and/or access the data to be transmitted. For example, in a peer-to-peer resource sharing network, a transfer data packet may include an identifier for the sending user, transaction details (e.g., account information, transaction amount, receiving user or entity information), and/or the like.

The transfer data packet may be initiated by an end-point device 140 associated with the sending user. Referring back to the example using the peer-to-peer resource sharing network, a sending user may be seeking to transmit a resource from an account associated with the sending user to another user (e.g., an account associated with the recipient) and the transfer data packet may be a data packet transmitted by the end-point device 140 over the network with information relating to the transmission (e.g., resource amount, account information, routing information, etc.) to initiate the transmission.

Referring now to Block 210 of FIG. 2, the method includes causing the data transfer to be executed. In various embodiments, the data transfer may be from an account associated with the sending user to an account associated with the recipient. The primary tag designation may be used to direct the data transfer. In various embodiments, the primary tag designation provides the system with information in order to execute the data transfer. For example, the primary tag designation may be used to obtain routing information, or the primary tag designation may itself be the routing information (e.g., the primary tag identifier may be a wallet identification number or account number for the recipient).

The data transfer includes the primary tag designation and the at least one of the one or more sub-tags included in the transfer data packet. The primary tag designation and the at least one of the one or more sub-tags included in the transfer data packet may be included as metadata or other information along with the data transfer. Additionally or alternatively, the primary tag designation and the at least one of the one or more sub-tags included in the transfer data packet may be included in a data log associated with the data transfer (e.g., a data log may be transmitted along with the data being transmitted and/or information to view and/or obtain the data log may be transmitted along with the data being transmitted).

FIG. 3 is a flow chart 300 that illustrates an example method of automated data sorting in an electronic network using sub-tags, in accordance with various embodiments of the present disclosure. The method may be carried out by various components of the distributed computing environment 100 discussed herein (e.g., the system 130, the one or more data centers 135, one or more end-point devices 140, etc.). An example system may include at least one non-transitory storage device and at least one processing device coupled to the at least one non-transitory storage device. In such an embodiment, the at least one processing device is configured to carry out the method discussed herein.

In various embodiments, the method and features of the flow chart 200 of FIG. 2 and flow chart 300 of FIG. 3 may be carried out by the same system and/or components of a system (e.g., system 130). For example, the system 130 may generate the user identifier for each user and then determine the target data center to transmit a resource data packet. Additionally, one or more other components of the environment may also carry out one or more of the operations. For example, the system 130 may generate the user identifier and an end-point device 140 associated with a user may tag each resource data packet with the user identifier for the given user.

Referring now to Block 302 of FIG. 3, the method includes receiving information relating to a plurality of data transfers. In various embodiments, the plurality of data transfers may be completed using the primary tag designation and the use of sub-tags discussed in reference to FIG. 2. Alternatively, the operations of FIG. 3 may be completed using data transfers that include a primary tag designation and one or more sub-tag, regardless of the way in which the sub-tag was assigned (e.g., a recipient may manually assign one or more sub-tags to a given data transfer after the data transfer is executed). In various embodiments, any data transfers that do not include a primary tag designation and at least one sub-tag may be excluded from the operations of the method (e.g., the method may include removing any data transfers that do not include a primary tag designation and at least one sub-tag).

The information relating to the plurality of data transfers may include the primary tag designation and the one or more sub-tags. The information relating to the plurality of data transfers may also include information relating to the data transfer, such as data transfer type, data transfer amount, etc. For example, in a peer-to-peer resource sharing network, the information relating to the plurality of data transfers may include the amount of the resource being transferred, the time of the data transfer, and/or any other information relating to the resource sharing.

Referring now to Block 304 of FIG. 3, the method includes determining the sub-tags to which one or more of the one or more of the plurality of data transfers correspond. In various embodiments, the system may group the data transfers based on the sub-tag. For example, all of the data transfers with a first sub-tag may be grouped together, all of the data transfers with a second sub-tag may be grouped together, etc. In various embodiments, the groups of the data transfers may be done with any number of different sub-tags. For example, all of the data transfers with a third sub-tag may be grouped together, all of the data transfers with a fourth sub-tag may be grouped together etc. Additionally, not every data transfer may be grouped with other data transfers. For example, the data transfer associated with a first sub-tag may be grouped together, while the other data transfers that are not associated with the first sub-tag are not grouped with other data transfers.

In various embodiments, two or more sub-tags may be combined, such that all data transfers with at least one of the two or more sub-tags may be grouped together. For example, two sub-tags may have similar individual categories, such that the combined group is also an individual category (e.g., a charity may have sub-group of a donation fund with a sub-tag for each sub-group). In various embodiments, a user accessing the sub-tag information may select sub-tags to include in a specific group (e.g., a user may select only sub-tags that are relevant to a specific topic or event).

Referring now to Block 306 of FIG. 3, the method includes causing a transmission of sub-tag information. The sub-tag information may be information relating to the grouped data transfers discussed in reference to Block 304 of FIG. 3. For example, the sub-tag information may be aggregated data relating to the data transfers that include a specific sub-tag (e.g., the first sub-tag, the second sub-tag, the third sub-tag, etc.).

In various embodiments, the sub-tag information may be provided to an end-point device 140 via a user interface. In various embodiments, the sub-tag information may be in the form of a sub-tag dashboard, one or more notifications, a searchable database, and/or the like. In an instance in which the sub-tag information includes a sub-tag dashboard, the sub-tag dashboard may include statistics relating to the data transfers (e.g., number of resources transferred with a certain sub-tag), one or more graphs of the sub-tag information, and/or other information relating to the given data transfers. In various embodiments, the sub-tag dashboard may be customizable (e.g., a user may be able to select the data relating to the data transfers are selected). For example, a user of an end-point device 140 in which the sub-tag dashboard is displayed may select which sub-tag(s) are included in the sub-tag dashboard, the type of information relating to the data transfers that is displayed, the presentation methods of the sub-tag information, and/or the like.

In various embodiments, the sub-tag information may be provided to an end-point device 140 associated with the recipient. For example, a user associated with an entity may be able to view the sub-tag information for the entity. In various embodiments, the sub-tag information may be provided to an end-point device 140 associated with the sending user. For example, the sending user may view information relating to one or more data transfers made by the sending user and/or any data transfers received by the sending user.

In various embodiments, the sub-tag information may be provided to an end-point device 140 associated with a network manager. The network manager may be able to review sub-tag information in order to adjust network setting and/or capabilities. For example, the network manager may determine from the sub-tag information that a large number of data transfers are being transmitted to a specific user or specific sub-tag associated with the user and may add additional bandwidth to allow for said data transfers.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for automated data sorting in an electronic network, the system comprising:
   at least one non-transitory storage device containing instructions; and
   at least one processing device coupled to the at least one non-transitory storage device, wherein the at least one processing device, upon execution of the instructions, is configured to:
   receive a primary tag designation for a transfer data packet from an end-point device associated with a sending user, wherein the primary tag designation corresponds to a recipient of a data transfer via a peer-to-peer resource sharing network;
   provide the end-point device associated with the sending user with one or more sub-tags associated with the primary tag designation, wherein each of the one or more sub-tags correspond to an individual category of the data transfer and the one or more sub-tags comprise data providing a purpose of the data transfer via the peer-to-peer resource sharing network;
   receive the transfer data packet from the end-point device associated with the sending user, wherein the transfer data packet comprises the primary tag designation and at least one of the one or more sub-tags, wherein the transfer data packet indicates data to be transmitted to the recipient in the data transfer;
   cause the data transfer to be executed, wherein the data transfer is from an account associated with the sending user to an account associated with the recipient, wherein the data transfer comprises the primary tag designation and the at least one of the one or more sub-tags included in the transfer data packet; and
   combine the one or more sub-tags with sub-tags from other data transfers and transmit the data from the combined sub-tags back to the end-point device and display the data on a searchable sub-tag dashboard.

2. The system of claim 1, wherein the at least one processing device, upon execution of the instructions, is configured to receive information relating to a plurality of data transfers, wherein each of the plurality of data transfers are associated with the primary tag designation and include at least one of the one or more sub-tags.

3. The system of claim 2, wherein the at least one processing device, upon execution of the instructions, is configured to determine one or more of the plurality of data transfers that correspond to a first sub-tag of the one or more sub-tags.

4. The system of claim 3, wherein the at least one processing device, upon execution of the instructions, is configured to cause a transmission of sub-tag information, wherein the sub-tag information is based on each of the data transfers that include the first sub-tag.

5. The system of claim 4, wherein the at least one processing device, upon execution of the instructions, is configured to determine one or more of the plurality of data transfers that correspond to a second sub-tag of the one or more sub-tags.

6. The system of claim 5, wherein the at least one processing device, upon execution of the instructions, is configured to cause a transmission of sub-tag information, wherein the sub-tag information is based on each the data transfers that include the first sub-tag and each of the data transfers that include the second sub-tag.

7. The system of claim 1, wherein the at least one processing device, upon execution of the instructions, is configured to receive at least one of the one or more sub-tags from the recipient, wherein the recipient indicates each of the one or more sub-tags that may be used with the primary tag designation.

8. A computer program product for automated data sorting in an electronic network, the computer program product comprising at least one non-transitory computer-readable medium having computer-readable program code portions embodied therein, the computer-readable program code portions comprising one or more executable portions configured to:
   receive a primary tag designation for a transfer data packet from an end-point device associated with a sending user, wherein the primary tag designation corresponds to a recipient of a data transfer via a peer-to-peer resource sharing network;
   provide the end-point device associated with the sending user with one or more sub-tags associated with the primary tag designation, wherein each of the one or more sub-tags correspond to an individual category of the data transfer and the one or more sub-tags comprise data providing a purpose of the data transfer via the peer-to-peer resource sharing network;
   receive the transfer data packet from the end-point device associated with the sending user, wherein the transfer data packet comprises the primary tag designation and at least one of the one or more sub-tags, wherein the transfer data packet indicates data to be transmitted to the recipient in the data transfer;
   cause the data transfer to be executed, wherein the data transfer is from an account associated with the sending user to an account associated with the recipient, wherein the data transfer comprises the primary tag designation and the at least one of the one or more sub-tags included in the transfer data packet; and combine the one or more sub-tags with sub-tags from other data transfers and transmit the data from the combined sub-tags back to the end-point device and display the data on a searchable sub-tag dashboard.

9. The computer program product of claim 8, wherein the computer-readable program code portions comprising one or more executable portions are also configured to receive information relating to a plurality of data transfers, wherein each of the plurality of data transfers are associated with the primary tag designation and include at least one of the one or more sub-tags.

10. The computer program product of claim 9, wherein the computer-readable program code portions comprising one or more executable portions are also configured to determine one or more of the plurality of data transfers that correspond to a first sub-tag of the one or more sub-tags.

11. The computer program product of claim 10, wherein the computer-readable program code portions comprising one or more executable portions are also configured to cause a transmission of sub-tag information, wherein the sub-tag information is based on each of the data transfers that include the first sub-tag.

12. The computer program product of claim 10, wherein the computer-readable program code portions comprising one or more executable portions are also configured to determine one or more of the plurality of data transfers that correspond to a second sub-tag of the one or more sub-tags.

13. The computer program product of claim 12, wherein the computer-readable program code portions comprising one or more executable portions are also configured to cause a transmission of sub-tag information, wherein the sub-tag information is based on each the data transfers that include the first sub-tag and each of the data transfers that include the second sub-tag.

14. The computer program product of claim 8, wherein the computer-readable program code portions comprising one or more executable portions are also configured to receive at least one of the one or more sub-tags from the recipient, wherein the recipient indicates each of the one or more sub-tags that may be used with the primary tag designation.

15. A method for automated data sorting in an electronic network, the method comprising:

receiving a primary tag designation for a transfer data packet from an end-point device associated with a sending user, wherein the primary tag designation corresponds to a recipient of a data transfer via a peer-to-peer resource sharing network;

providing the end-point device associated with the sending user with one or more sub-tags associated with the primary tag designation, wherein each of the one or more sub-tags correspond to an individual category of the data transfer and the one or more sub-tags comprise data providing a purpose of the data transfer via the peer-to-peer resource sharing network;

receiving the transfer data packet from the end-point device associated with the sending user, wherein the transfer data packet comprises the primary tag designation and at least one of the one or more sub-tags, wherein the transfer data packet indicates data to be transmitted to the recipient in the data transfer;

causing the data transfer to be executed, wherein the data transfer is from an account associated with the sending user to an account associated with the recipient, wherein the data transfer comprises the primary tag designation and the at least one of the one or more sub-tags included in the transfer data packet; and combining the one or more sub-tags with sub-tags from other data transfers and transmit the data from the combined sub-tags back to the end-point device and display the data on a searchable sub-tag dashboard.

16. The method of claim 15, further comprising receiving information relating to a plurality of data transfers, wherein each of the plurality of data transfers are associated with the primary tag designation and include at least one of the one or more sub-tags.

17. The method of claim 16, further comprising determining one or more of the plurality of data transfers that correspond to a first sub-tag of the one or more sub-tags or a second sub-tag of the one or more sub-tags.

18. The method of claim 17, further comprising causing a transmission of sub-tag information, wherein the sub-tag information is based on each of the data transfers that include the first sub-tag.

19. The method of claim 17, further comprising causing a transmission of sub-tag information, wherein the sub-tag information is based on each the data transfers that include the first sub-tag and each of the data transfers that include the second sub-tag.

20. The method of claim 15, further comprising receiving at least one of the one or more sub-tags from the recipient, wherein the recipient indicates each of the one or more sub-tags that may be used with the primary tag designation.

* * * * *